(12) United States Patent
Schmidt et al.

(10) Patent No.: US 10,832,068 B2
(45) Date of Patent: Nov. 10, 2020

(54) SYSTEM AND METHOD FOR DETECTING THE FATIGUE OF A VEHICLE DRIVER

(71) Applicant: Bayerische Motoren Werke Aktiengesellschaft, Munich (DE)

(72) Inventors: Elisabeth Schmidt, Munich (DE); Stefan Wiedemann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/543,856

(22) Filed: Aug. 19, 2019

(65) Prior Publication Data
US 2019/0370582 A1 Dec. 5, 2019

Related U.S. Application Data

(63) Continuation of application No. PCT/EP2017/078018, filed on Nov. 2, 2017.

(30) Foreign Application Priority Data

Feb. 20, 2017 (DE) .................. 10 2017 202 659

(51) Int. Cl.
*G06K 9/00* (2006.01)
*B60W 40/08* (2012.01)
(52) U.S. Cl.
CPC ......... *G06K 9/00845* (2013.01); *B60W 40/08* (2013.01); *G06K 9/00604* (2013.01); *B60W 2040/0818* (2013.01)
(58) Field of Classification Search
CPC .......... G06K 9/00845; G06K 9/00604; B60W 40/08

USPC ......................................... 340/439
See application file for complete search history.

(56) References Cited

U.S. PATENT DOCUMENTS

| 6,097,295 A * | 8/2000 | Griesinger ............... A61B 5/18 340/576 |
| 7,488,294 B2 | 2/2009 | Torch |
| 7,747,068 B1 * | 6/2010 | Smyth .................... G03B 17/00 382/154 |
| 9,751,534 B2 * | 9/2017 | Fung .................. G06K 9/00892 |

(Continued)

FOREIGN PATENT DOCUMENTS

| AU | 2013204435 B2 | 8/2015 |
| DE | 198 03 158 C1 | 5/1999 |

(Continued)

OTHER PUBLICATIONS

German-language Search Report issued in counterpart German Application No. 10 2017 202 659.6 dated Sep. 11, 2017 with partial English translation (15 pages).

(Continued)

*Primary Examiner* — Kerri L McNally
(74) *Attorney, Agent, or Firm* — Crowell & Moring LLP

(57) ABSTRACT

A system for the exact detection of the fatigue of a driver of a vehicle includes at least one camera for detecting the pupil diameter of the driver of the vehicle, at least one sensor for detecting a current luminance in the vehicle, and at least one computer module for detecting the fatigue of the driver of the vehicle by calculation. The calculation is based on the detected pupil diameter and the detected, current luminance in the vehicle.

11 Claims, 4 Drawing Sheets

(56) References Cited

U.S. PATENT DOCUMENTS

| | | | | |
|---|---|---|---|---|
| 2003/0142041 A1* | 7/2003 | Barlow | G06K 9/0061 | 345/8 |
| 2003/0218719 A1* | 11/2003 | Abourizk | G06K 9/00597 | 351/209 |
| 2004/0170304 A1* | 9/2004 | Haven | A61B 5/163 | 382/115 |
| 2006/0110008 A1* | 5/2006 | Vertegaal | G06T 7/251 | 382/103 |
| 2007/0120691 A1* | 5/2007 | Braun | G08B 21/06 | 340/576 |
| 2007/0291232 A1* | 12/2007 | Marshall | A61B 5/163 | 351/246 |
| 2009/0018419 A1 | 1/2009 | Torch | | |
| 2011/0292668 A1* | 12/2011 | Schofield | B60Q 1/1423 | 362/466 |
| 2012/0050516 A1* | 3/2012 | Tsukizawa | G06K 9/00604 | 348/78 |
| 2012/0069301 A1* | 3/2012 | Hirata | A61B 3/112 | 351/209 |
| 2015/0196245 A1 | 7/2015 | Peake | | |
| 2016/0299354 A1* | 10/2016 | Shtukater | G02C 7/04 | |

FOREIGN PATENT DOCUMENTS

| | | |
|---|---|---|
| DE | 103 59 125 A1 | 7/2005 |
| DE | 10 2013 212 877 A1 | 1/2015 |

OTHER PUBLICATIONS

International Search Report (PCT/ISA/210) issued in PCT Application No. PCT/EP2017/078018 dated Mar. 5, 2018 with English translation (four (4) pages).

German-language Written Opinion (PCT/ISA/237) issued in PCT Application No. PCT/EP2017/078018 dated Mar. 5, 2018 (seven (7) pages).

* cited by examiner

SYSTEM AND METHOD FOR DETECTING THE FATIGUE OF A VEHICLE DRIVER

CROSS REFERENCE TO RELATED APPLICATIONS

This application is a continuation of PCT International Application No. PCT/EP2017/078018, filed Nov. 2, 2017, which claims priority under 35 U.S.C. § 119 from German Patent Application No. 10 2017 202 659.6, filed Feb. 20, 2017, the entire disclosures of which are herein expressly incorporated by reference.

BACKGROUND AND SUMMARY OF THE INVENTION

The present invention relates to a system and a method for detecting the fatigue of a driver of a vehicle.

It is known that drivers of vehicles or vehicle drivers must maintain a particularly high level of sustained attentiveness (vigilance). If the level of attentiveness of the vehicle driver falls, for example because of fatigue due to lack of sleep and/or a monotonous driving situation, the risk of an accident increases, and consequently represents a risk for the vehicle driver and other road users. At the same time, drivers of vehicles can find it difficult to maintain sustained attentiveness with regard to driving the vehicle, even during daytime journeys. This applies in particular in the case of long and monotonous routes, such as for example on freeways. In the case of systems for detecting the fatigue of a driver of a vehicle, it is a challenge to detect with certainty when the driver begins to be affected by fatigue. If fatigue is falsely detected (i.e. the driver of the vehicle is being vigilant), corresponding measures are extremely uncomfortable for the vehicle driver. If, on the other hand, fatigue or a reduction in vigilance is incorrectly not detected, that represents a risk for the vehicle driver and the other road users concerned.

The object of the invention is to avoid the aforementioned disadvantages and to provide a solution that makes exact detection of the fatigue of the driver of a vehicle possible.

According to a first aspect, a system for the exact detection of fatigue of a driver of a vehicle comprises:

at least one camera for sensing the pupil diameter of the driver of the vehicle;

at least one sensor for sensing a current luminance in the vehicle; and at least one computing module for detecting the fatigue of the driver of the vehicle by calculation, wherein the calculation is based on the sensed pupil diameter and the sensed, current luminance in the vehicle.

The vehicle may be for example a motor vehicle, a rail vehicle, an aircraft, a watercraft, etc. In the vehicle there may be arranged at least one camera, which is designed to detect the pupil diameter of the driver of the vehicle (also referred to hereinafter as the driver). In addition, the vehicle may comprise at least one sensor for detecting a current luminance. The luminance of a surface area determines with which surface luminosity the eye of the driver perceives the surface, and consequently relates directly to the visual sensory perception. The vehicle also comprises a computing module, which is designed to detect the fatigue of the driver of the vehicle by calculation. The calculation is based on the pupil diameter sensed by the at least one camera and the sensed, current luminance in the vehicle.

Preferably, the at least one camera comprises a high-resolution interior camera and/or a high-resolution infrared camera.

The at least one camera may comprise a high-resolution interior camera. A high-resolution interior camera advantageously allows the pupil diameter to be determined very exactly. In addition or as an alternative to this, the at least one camera may comprise a high-resolution infrared camera. This advantageously allows the pupil diameter still to be determined very exactly even when there are very poor light conditions in the vehicle. The high-resolution interior camera and the high-resolution infrared camera may be realized in one camera module. In another example, they may be realized in different camera modules. The at least one camera may comprise any desired and/or suitable numerical combination of interior cameras and/or infrared cameras.

Preferably, the at least one sensor for sensing the current luminance in the vehicle comprises an adaptive forward lighting sensor, AFL sensor.

The adaptive forward lighting sensor (AFL sensor) may for example sense a current luminance x. If the AFL sensor is for example designed to sense an intensity of illumination E on the surroundings of the vehicle (i.e. what luminous flux in lumens, lm, falls on a unit of area in m² surrounding the vehicle, also known as lux, lx:

$$1 \text{ lx} = 1 \ \frac{\text{lm}}{\text{m}^2},$$

a corresponding conversion may be performed, first into the luminous intensity in cd and then into the (current) luminance x in cd/m².

$$x = \frac{I}{A} = \frac{E \cdot r^2}{A}$$

Here, the luminance x [cd/m²] is the quotient of the luminous intensity I [cd] and the visible illuminated surface area [m²]. The luminous intensity I [cd] is the product of the intensity of illumination E [lx] and the square of the distance r [m] between the illuminated surface area and the eye. The parameters A and r are decisively determined by the size of the windshield and the distance between the eye and the windshield and vary within the range A=1.5 m-2.5 m and r=0.5 m-0.9 m.

The conversion may be performed for example by the computing module or any other suitable module with a corresponding computing capacity in the vehicle. Thus, an AFL sensor already fitted in the vehicle (in addition to the adaptive forward lighting control of the vehicle) may be advantageously used for sensing the current luminance x, so that no additional sensor is needed for sensing the current luminance in the vehicle.

Preferably, the detection of the fatigue of the driver of the vehicle by the computing module comprises:

calculation of the pupil diameter with respect to the sensed, current luminance;

comparison of the sensed pupil diameter with the calculated pupil diameter with respect to the sensed luminance; and if the sensed pupil diameter is smaller by more than a constant range [k−0.3 mm; k+1.4 mm] of a constant k=0.6 mm than the calculated pupil diameter:

detection of the fatigue of the driver of the vehicle, wherein the detection of the fatigue of the driver of the vehicle can be corrected by a time-related correction factor with regard to the rate of reduction of the pupil diameter; and/or a light assist sensor.

The calculation of the pupil diameter $D_x$ in [mm] with respect to the sensed, current luminance x may for example be calculated by the following formula:

$$D_x = 10^{0.8558 - 0.000401(\log x + 8.4)^3}$$

However, this calculation only gives the pupil diameter with respect to the current luminance x (i.e. without further influencing factors).

The sensed pupil diameter $D_{x,y}$ on the other hand gives the pupil diameter of the driver with respect to the current luminance x and the fatigue of the driver y and can be represented as follows:

$$D_{x,y} = 10^{0.8558 - 0.000401(\log x + 8.4)^3} - k \cdot y$$

The following then follows:
If $$D_x - D_{x,y} > [k - 0.3 \text{ mm } k + 1.4 \text{ mm}], \text{ where } k = 0.6 \text{ mm};$$

then the driver is affected by fatigue. In order to achieve a particularly exact determination of the fatigue, and consequently to avoid a false alarm in the fatigue detection, the fatigue may preferably be determined for [k−0.1 mm; k+1.4 mm].

The calculation of the fatigue of the driver of the vehicle by the computing unit may in this case comprise appropriate correction factors. For example, a correction factor with regard to the rate of reduction of the pupil diameter of the driver may be introduced or used, in that for example a time derivative of the pupil diameter of the driver is obtained. If for example the pupil diameter of the driver reduces very quickly, this is because there is a sudden incidence of light, and fatigue is not detected by the computing module. If, on the other hand, the pupil diameter of the driver reduces slowly over time (cf. FIG. 3 and FIG. 4), then fatigue is detected by the computing module.

The correction factor may for example be obtained from the following formula:
if $$\frac{\Delta D}{\Delta t} > -0.05 \frac{\text{mm}}{\text{s}},$$

then the contraction of the pupil diameter is caused by fatigue
if $$\frac{\Delta D}{\Delta t} < -0.05 \frac{\text{mm}}{\text{s}},$$

then the contraction of the pupil diameter is caused by incidence of light
where
D=sensed pupil diameter of the driver 120;
t=(point in) time;

$$\frac{\Delta D}{\Delta t} = \frac{D_2 - D_1}{t_2 - t_1};$$

that is to say the difference of the pupil diameter $D_2$ sensed by the camera at the point in time $t_2$ and the pupil diameter $D_1$ sensed by the camera at the point in time $t_1$ in relation to the distance of the point in time $t_2$ from the point in time $t_1$.

In a further example, the computing module may also access data concerning the pupil diameter during wakefulness and/or fatigue that are stored in advance for the driver (for example in a memory unit in the vehicle), in order to make the calculation of the fatigue of the driver even more precise. In addition or as an alternative to this, the current luminance x may be corrected or regulated by the automatic light assist sensor. For example, when driving at night-time, an oncoming vehicle with lights switched on can advantageously be detected by using the automatic light assist sensor. This allows a correction factor for influencing the pupil diameter of the driver by the light of oncoming vehicles to be taken into account. When an oncoming vehicle with lights switched on is detected by the automatic light assist sensor, the correction factor may be the suspension of the calculation of the fatigue of the driver by the computing module. Optionally, the computing module may also take into account further correction factors in the calculation of the fatigue of the driver, for example times of day and/or times of year and/or current weather conditions in conjunction with the orientation of the vehicle. The orientation of the vehicle may be determined for example by a navigation system in the vehicle, wherein data regarding the times of day and/or times of year and current weather conditions may be taken from a memory unit in the vehicle and/or from one or more (backend) servers.

Preferably, the system also comprises:
at least one control unit, wherein the control unit is designed to introduce at least one corresponding countermeasure when fatigue of the driver of the vehicle is detected.

For example, the countermeasure may be an optical countermeasure (for example via an output unit in the vehicle) and/or acoustic countermeasure (for example via a loudspeaker in the vehicle) and/or a reduction of the interior temperature, for example by a corresponding temperature control via the air-conditioning system in the vehicle.

According to a second aspect of the present invention, the underlying object is achieved by a method for the exact detection of the fatigue of a driver of a vehicle, comprising:
sensing, by at least one camera, the pupil diameter of the driver of the vehicle;
sensing, by at least one sensor, a current luminance in the vehicle; and
detecting, by calculation in a computing module, whether the driver of the vehicle is affected by fatigue, wherein the calculation is based on the sensed pupil diameter and the sensed, current luminance in the vehicle.

Preferably, the at least one camera comprises a high-resolution interior camera and/or a high-resolution infrared camera.

Preferably, the at least one sensor for sensing the current luminance in the vehicle comprises an adaptive forward lighting sensor, AFL sensor.

Preferably, the detection of the fatigue of the driver of the vehicle by the computing module comprises:
calculating the pupil diameter with respect to the sensed, current luminance;
comparing the sensed pupil diameter with the calculated pupil diameter with respect to the sensed luminance; and
if the sensed pupil diameter is smaller by more than a constant range [k−0.3 mm; k+1.4 mm] of a constant k=0.6 mm than the calculated pupil diameter:

detecting the fatigue of the driver of the vehicle;

wherein the detecting of the fatigue of the driver of the vehicle can be corrected by a time-related correction factor with regard to the rate of reduction of the pupil diameter; and/or a light assist sensor.

Preferably, the method also comprises introducing, by at least one control unit, a countermeasure when fatigue is detected.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
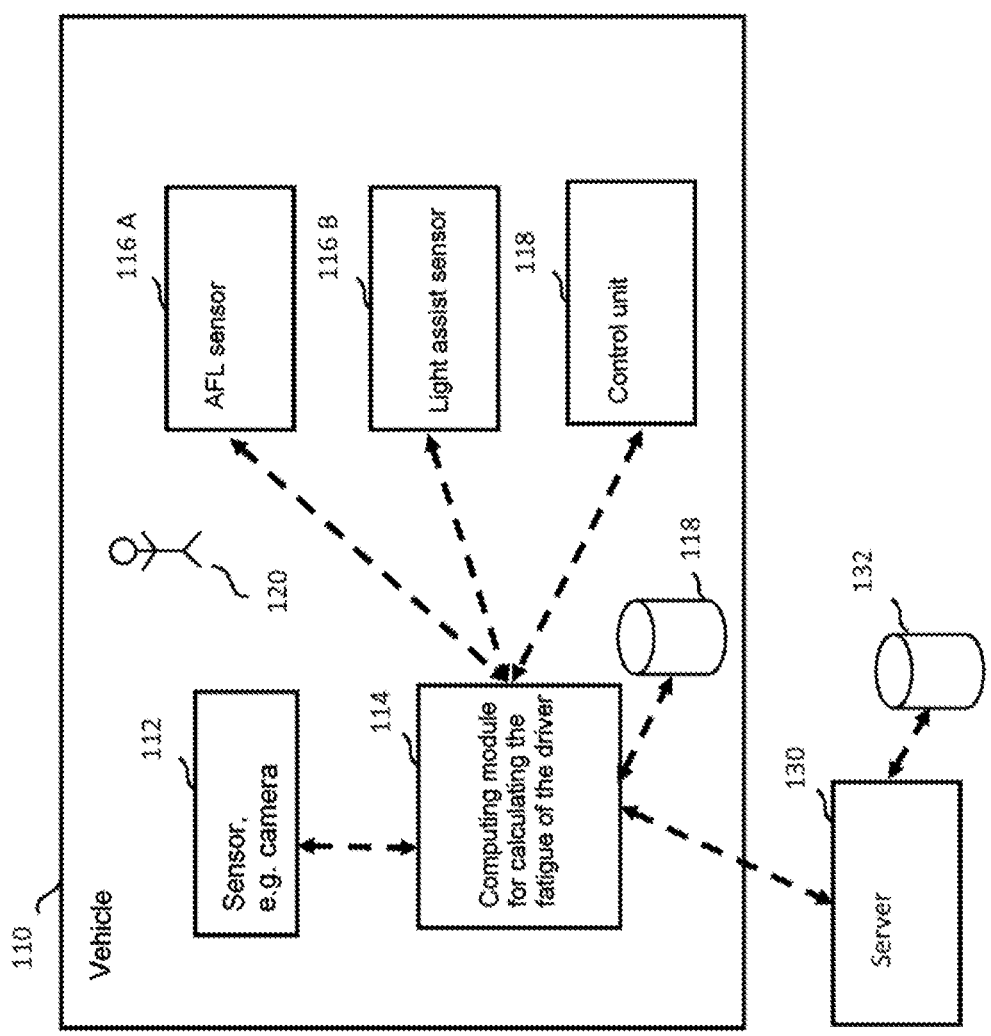
FIG. 1 shows by way of example a system for the exact detection of the fatigue of a driver of a vehicle.

FIG. 1 shows by way of example a system 100 for the exact detection of the fatigue of a driver 120 of a vehicle 110 (hereinafter also referred to as the driver 120). The vehicle 110 may be for example a motor vehicle, a rail vehicle, an aircraft, a watercraft, etc. The system 100 comprises at least one camera 112 for sensing the pupil diameter of the driver 120. The at least one camera 112 may comprise a high-resolution interior camera. The pupil diameter of the driver 120 can advantageously be determined very exactly by a high-resolution interior camera. In addition or as an alternative to this, the at least one camera 112 may comprise a high-resolution infrared camera. This advantageously allows the pupil diameter of the driver 120 still to be determined very exactly even when there are very poor light conditions (darkness, tunnel, . . . ) in the vehicle 110. The high-resolution interior camera and the high-resolution infrared camera may be realized in one camera module. In another example, they may be realized in different camera modules. The at least one camera 112 may comprise any desired and/or suitable numerical combination of interior cameras and/or infrared cameras.

The system 100 also comprises at least one sensor 116 A sensing a current luminance in the vehicle 100. The luminance (of a surface area in the vehicle 110) determines with which surface luminosity the eye of the driver 120 perceives the surface, and consequently relates directly to the visual sensory perception. The at least one sensor 116 A for sensing the current luminance in the vehicle 110 may comprise an adaptive forward lighting sensor, AFL sensor 116 A.

The adaptive forward lighting sensor (AFL sensor) 116 A may for example sense a current luminance x. If the AFL sensor 116 A is for example designed to sense an intensity of illumination on the surroundings of the vehicle (i.e. what luminous flux in lumens, lm, falls on a unit of area in m² surrounding the vehicle, also known as lux, lx:

$$1 \text{ lx} = 1 \frac{\text{lm}}{\text{m}^2},$$

a corresponding conversion may be performed, first into the luminous intensity in cd and finally into the (current) luminance x in cd/m².

$$x = \frac{I}{A} = \frac{E \cdot r^2}{A}$$

Here, the luminance x [cd/m²] is the quotient of the luminous intensity l [cd] and the visible illuminated surface area [m²]. The luminous intensity l [cd] is the product of the intensity of illumination E [lx] and the square of the distance r [m] between the illuminated surface area and the eye. The parameters A and r are decisively determined by the size of the windshield and the distance between the eye and the windshield and vary within the range A=1.5 m-2.5 m and r=0.5 m-0.9 m.

The conversion may be performed for example by the computing module 114, see below, or any other suitable module (not shown) with a corresponding computing capacity in the vehicle 110. Thus, an AFL sensor 116 A already fitted in the vehicle 110 (in addition to the adaptive forward lighting control of the vehicle 110) may be advantageously used for sensing the current luminance x, so that no additional sensor is needed for sensing the current luminance in the vehicle 110.

The system 100 may also comprise at least one computing module 114 for detecting the fatigue of the driver of the vehicle 120 by calculation, wherein the calculation is based on the sensed pupil diameter and the sensed, current luminance in the vehicle 110. The computing module 114 may carry out the calculation on the basis of the pupil diameter of the driver 120, sensed by the at least one camera 112, and the current luminance in the vehicle 110, sensed by the at least one sensor 116 A. In particular, the computing module 114 may carry out the calculation of the pupil diameter $D_x$ in [mm] with respect to the sensed, current luminance x for example with reference to the following formula:

$$D_x = 10^{0.8558 - 0.000401(\log x + 8.4)^3}$$

However, this calculation only gives the pupil diameter with respect to the current luminance x (i.e. without further influencing factors such as the fatigue of the driver 120).

The pupil diameter $D_{x,y}$ sensed by the at least one camera 112 on the other hand gives the pupil diameter of the driver 120 with respect to the current luminance x and the fatigue of the driver y and can be represented as follows:

$$D_{x,y} = 10^{0.8558 - 0.000401(\log x + 8.4)^3} - k \cdot y$$

In a next step, a comparison of the pupil diameter sensed by the at least one camera 112 with the pupil diameter calculated by the computing module 114 with respect to the sensed luminance may take place.

If the pupil diameter sensed by the at least one camera 112 is smaller by more than a range [k−0.3 mm; k+1.4 mm] of a constant k=0.6 mm than the calculated pupil diameter, i.e. if $$D_x - D_{x,y} > [k-0.3 \text{ mm } k+1.4 \text{ mm}], \text{ where } k=0.6 \text{ mm};$$

then the fatigue of the driver 120 of the vehicle 110 is detected. In order to obtain a particularly exact determination of the fatigue, and consequently to avoid a false alarm in the fatigue detection, the fatigue may preferably be determined for [k−0.1 mm; k+1.4 mm], where k=0.6 mm.

The calculation of the fatigue of the driver 120 of the vehicle 110 by the computing unit 114 may in this case comprise appropriate correction factors. For example, a correction factor with regard to the rate of reduction of the pupil diameter of the driver 120 may be introduced or used, in that for example a time derivative of the pupil diameter of the driver 120 is obtained. If for example the pupil diameter of the driver 120 reduces very quickly, this is because there is a sudden incidence of light, and fatigue is not detected by the computing module 114. If, on the other hand, the pupil diameter of the driver 120 reduces slowly over time (cf. FIG. 3 and FIG. 4), then fatigue is detected by the computing module 114.

The correction factor may for example be obtained from the following formula:
if $$\frac{\Delta D}{\Delta t} > -0.05 \frac{mm}{s},$$

then the contraction of the pupil diameter is caused by fatigue
if $$\frac{\Delta D}{\Delta t} < -0.05 \frac{mm}{s},$$

then the contraction of the pupil diameter is caused by incidence of light
where
D=sensed pupil diameter of the driver 120;
t=(point in) time;

$$\frac{\Delta D}{\Delta t} = \frac{D_2 - D_1}{t_2 - t_1};$$

that is to say the difference of the pupil diameter $D_2$ sensed by the camera at the point in time $t_2$ and the pupil diameter $D_1$ sensed by the camera at the point in time $t_1$ in relation to the distance of the point in time $t_2$ from the point in time $t_1$.

In a further example, the computing module 114 may also access data concerning the pupil diameter during wakefulness and/or fatigue that are stored in advance for the driver 120 (for example in a memory unit 118 in the vehicle 110), in order to make the calculation of the fatigue of the driver 120 even more precise. In addition or as an alternative to this, the current luminance x may be corrected or regulated by the automatic light assist sensor 116 B. For example, when driving at night-time, an oncoming vehicle with lights switched on can advantageously be detected by using the automatic light assist sensor 116 B. This allows a correction factor for influencing the pupil diameter of the driver 120 by the light of oncoming vehicles to be taken into account. When an oncoming vehicle with lights switched on is detected by the automatic light assist sensor 116 B, the correction factor may be the suspension of the calculation of the fatigue of the driver 120 by the computing module 114. Optionally, the computing module 114 may also take into account further correction factors in the calculation of the fatigue of the driver 120, for example times of day and/or times of year and/or current weather conditions in conjunction with the orientation of the vehicle. The orientation of the vehicle may be determined for example by a navigation system in the vehicle, wherein data regarding the times of day and/or times of year and current weather conditions may be taken from a memory unit 118 in the vehicle 110 and/or from one or more (backend) servers 130.

The system 100 may also comprise at least one control unit 118, wherein the control unit 118 is designed to introduce at least one corresponding countermeasure when fatigue of the driver 120 of the vehicle 110 is detected. For example, the countermeasure may be an optical countermeasure (for example via an output unit in the onboard computer of the vehicle 110) and/or acoustic countermeasure (for example via a loudspeaker in the vehicle 110) and/or a reduction of the interior temperature, for example by a corresponding temperature control via the air-conditioning system in the vehicle 110, as further explained by way of example below with reference to FIGS. 3 and 4.

Figure 2:
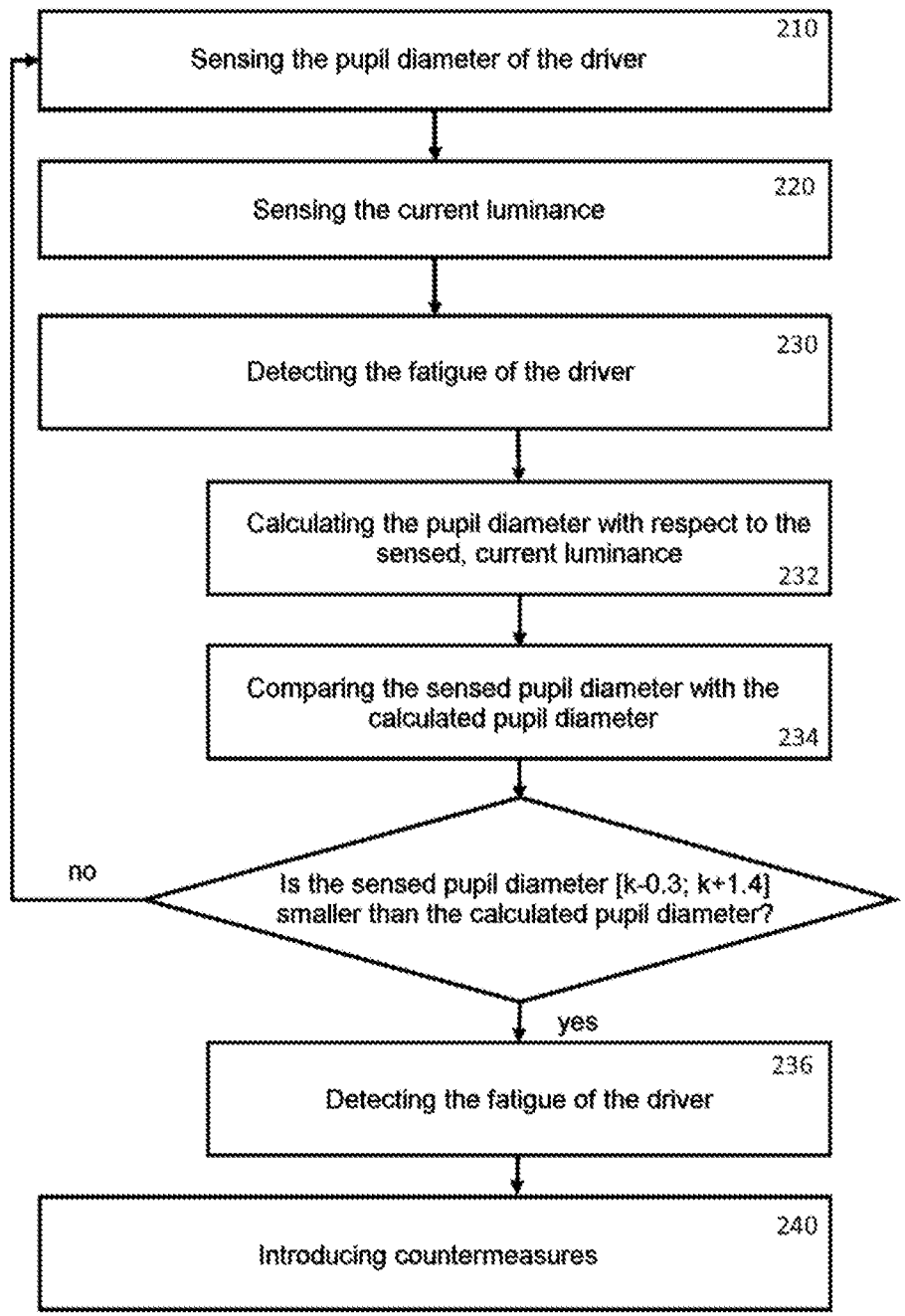
FIG. 2 shows by way of example a method for the exact detection of the fatigue of a driver of a vehicle.

FIG. 2 shows by way of example a method 200 for the exact detection of the fatigue of a driver 120 of a vehicle 110 (also referred to hereinafter as the driver 120), wherein the method steps can be performed by a system 100 as described with reference to FIG. 1, and the method steps can take place as described with reference to FIG. 1. The method in this case comprises:
sensing 210, by at least one camera 112, the pupil diameter of the driver 120 of the vehicle 110, wherein the at least one camera 112 may comprise a high-resolution interior camera and/or a high-resolution infrared camera;
sensing 220, by at least one sensor 116 A, a current luminance in the vehicle 110, wherein the at least one sensor 116 A may comprise an additive forward lighting sensor, AFL sensor 116 A; and
detecting 230, by calculation in a computing module 114, whether the driver 120 of the vehicle 110 is affected by fatigue, wherein the calculation is based on the pupil diameter sensed by the at least one camera 112 and the sensed, current luminance in the vehicle 110.

The detecting 230 of the fatigue of the driver 120 of the vehicle 110 (or the driver 120) by the computing module 114 may in this case comprise:
calculating 232 the pupil diameter with respect to the current luminance sensed by the at least one sensor 116 A;
comparing 234 the pupil diameter sensed by the at least one camera 112 with the pupil diameter calculated by the computing module 114 with respect to the sensed luminance; and
if the pupil diameter sensed by the at least one camera 112 is smaller by more than a constant range [k−0.3 mm; k+1.4 mm] of a constant k=0.6 mm than the pupil diameter calculated by the computing module 114:
detecting 236 the fatigue of the driver 120 of the vehicle 122;
wherein the detecting 236 of the fatigue of the driver 120 of the vehicle 110 can be corrected by a time-related correction factor with regard to the rate of reduction of the pupil diameter; and/or a light assist sensor 116 B.

Figure 3:
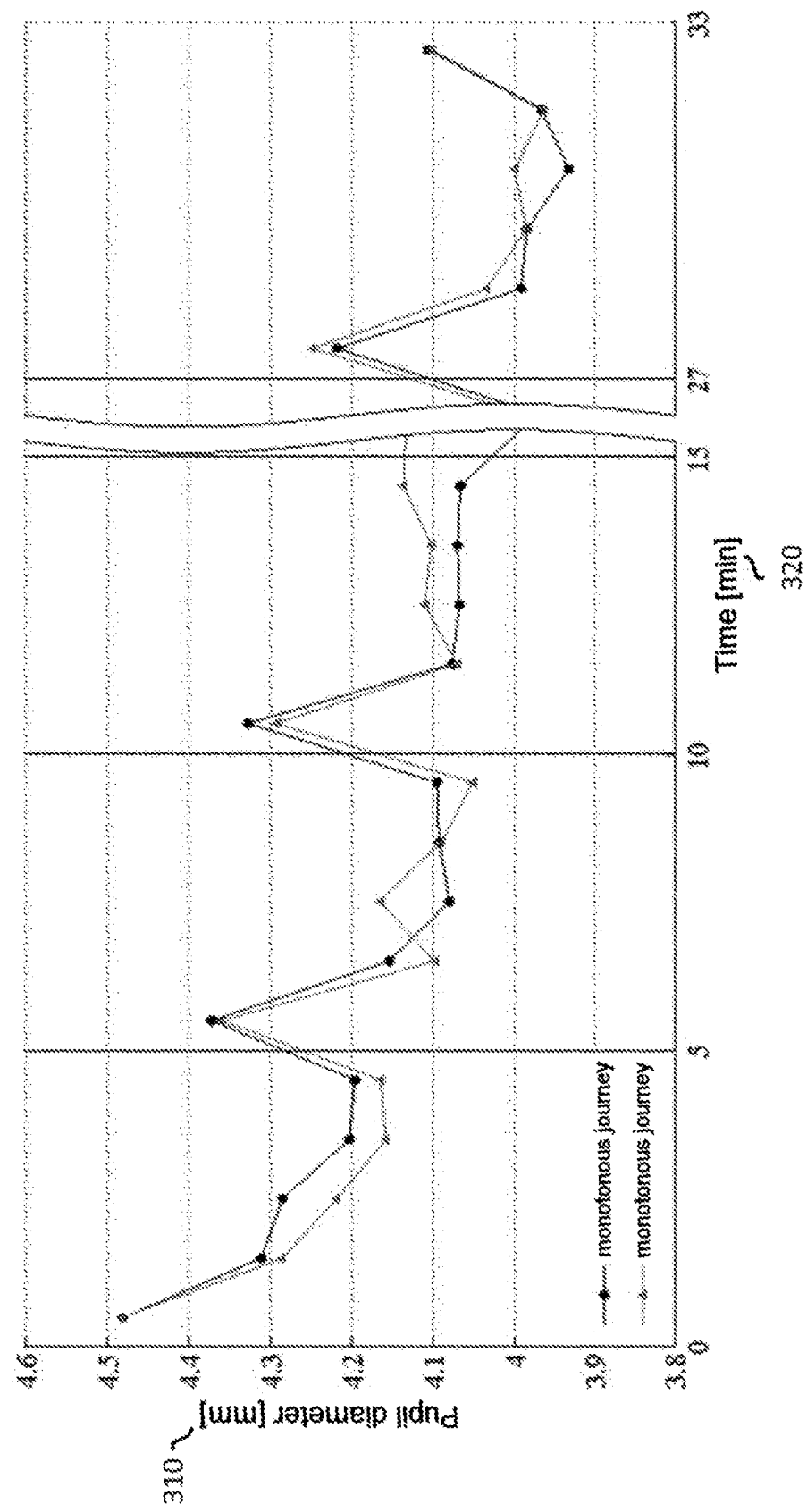
FIG. 3 shows a decrease in the pupil diameter of test subjects during monotonous driving over time under constant light conditions, wherein the test subjects were confronted with external stimuli at certain points in time.
Figure 4:
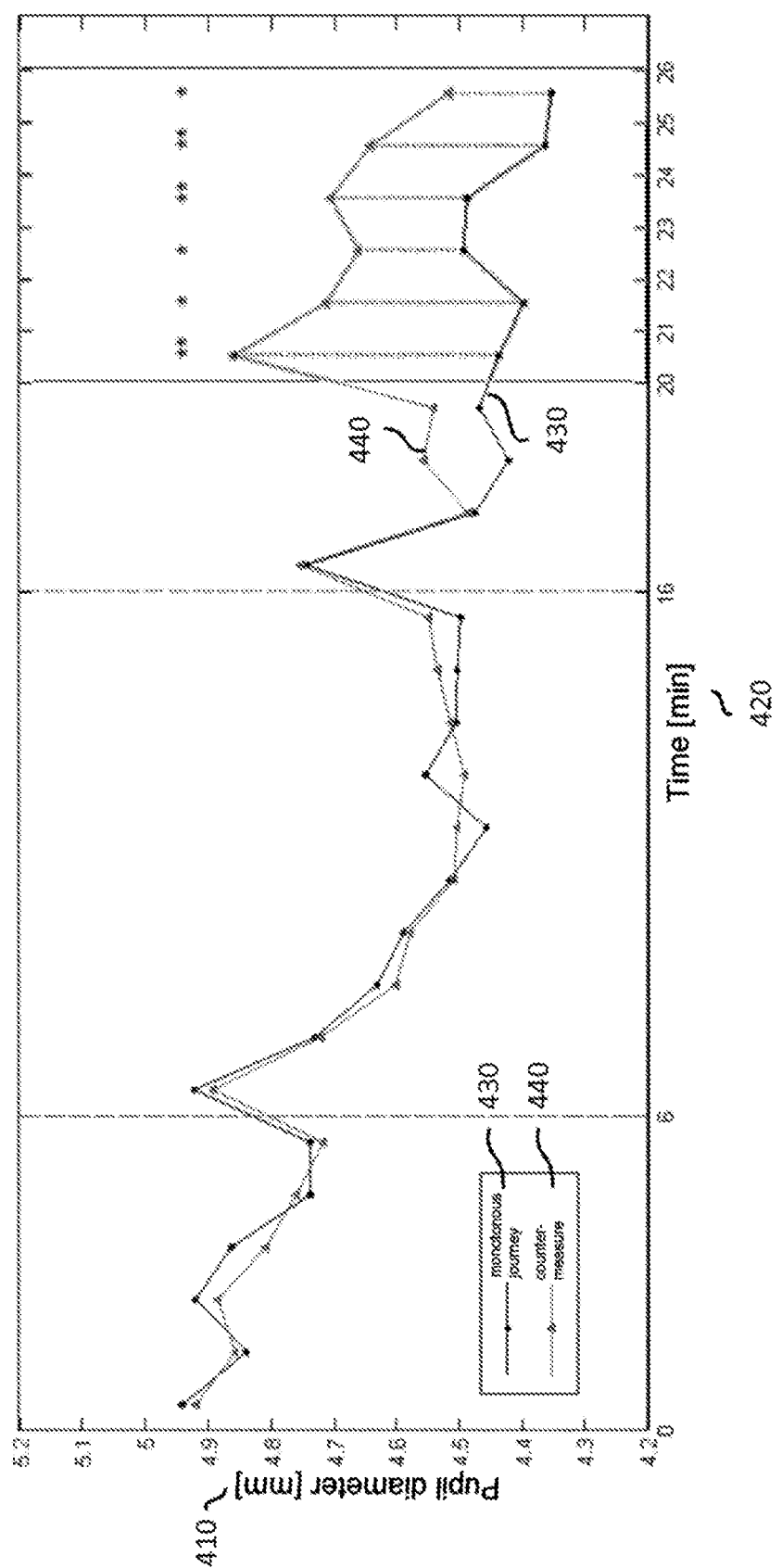
FIG. 4 shows by way of example a decrease in the pupil diameter of test subjects during monotonous driving over time under constant light conditions and the positive influence of an external stimulus on the fatigue of the test subjects.

The method may also comprise introducing 240, by at least one control unit 118, a countermeasure when fatigue 236 is detected by the computing module 114, as described for example with reference to FIGS. 3 and 4.

FIG. 3 shows a decrease in the average pupil diameter in millimeters (mm) 310 of test subjects during monotonous driving over time in minutes (min) 320, wherein the test subjects were confronted with external stimuli at certain points in time, in particular at minutes 5, 10 and 27. These are average values of two monotonous journeys undertaken by a large number of test subjects, which clearly demonstrate that during monotonous journeys the fatigue of the test subjects increases continuously, and consequently the pupil diameter is reduced continuously.

In particular, it was possible thereby to establish that even in the case of journeys of half an hour, as represented in FIGS. 3 and 4, the pupil diameter of the test subjects was already reduced by about 0.6 mm as a result of fatigue occurring. The enlargement of the pupil diameter at minutes 5, 10 and 27 occurred in particular due to verbal questioning of the test subjects during the test journeys in the simulator. What is concerned here in particular is the evaluation or results of a driving simulator study. It is consequently found that a cognitive effort, such as for example the answering of questions, comprises a widening of the pupil diameter, and consequently increased wakefulness or an increased level of attentiveness.

FIG. 4 shows by way of example a decrease in the pupil diameter in mm 410 of test subjects during monotonous driving over time in minutes 420. In particular, from minute 20 the positive influence of an external stimulus on the fatigue of the test subjects was found as the result of a further driving simulator study. A first journey was carried out (=monotonous journey) in a way similar to as described with reference to FIG. 3, with questions at minutes 6 and 16 (=monotonous journey 430). In a second monotonous journey (=countermeasure 440), from minute 20 a countermeasure was introduced, in this case by activating the respective test subjects by a thermal stimulus. It is clearly evident that the thermal stimulus had an effect in the enlargement of the pupil diameter of the test subjects. In this case it was found that the difference in the pupil diameters between the monotonous journey 430 and the journey with a countermeasure 440 at the minutes indicated with * and S* shows a statistically significant difference, in which the differences in the pupil diameters of the test subjects are no longer the result of variance or coincidence, wherein at * there is a significant difference of $p<0.05$ and at ** a highly significant difference of $p<0.001$.

It is consequently found that the pupil diameter is very well suited as an indicator of the fatigue or vigilance of drivers, as long as the light conditions are constant.

The system 100 and the method 200, as described with reference to FIGS. 1 and 2, thus allow an exact sensing of the fatigue of drivers 120 by taking into account non-constant light conditions with respect to the pupil diameter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for exact detection of fatigue of a driver of a vehicle, comprising:
   at least one camera for sensing pupil diameter of the driver of the vehicle;
   at least one sensor for sensing a current luminance in the vehicle; and
   at least one computing module for detecting the fatigue of the driver of the vehicle by calculation, wherein
   the calculation is based on the sensed pupil diameter and the sensed, current luminance in the vehicle; and
   the computing module is further configured to suspend the calculation based on the sensed, current luminance.

2. The system according to claim 1, wherein
   the at least one camera comprises a high-resolution interior camera and/or a high-resolution infrared camera.

3. The system according to claim 1, wherein
   the at least one sensor for sensing the current luminance in the vehicle comprises an adaptive forward lighting sensor.

4. A system for exact detection of fatigue of a driver of a vehicle, comprising:
   at least one camera for sensing pupil diameter of the driver of the vehicle;
   at least one sensor for sensing a current luminance in the vehicle; and
   at least one computing module for detecting the fatigue of the driver of the vehicle by calculation, wherein
   the calculation is based on the sensed pupil diameter and the sensed, current luminance in the vehicle; and
   the detecting of the fatigue of the driver of the vehicle by the computing module comprises:
   calculation of the pupil diameter with respect to the sensed, current luminance;
   comparison of the sensed pupil diameter with the calculated pupil diameter with respect to the sensed luminance; and
   if the sensed pupil diameter is smaller by more than a constant range $[k-0.3; k+1.4]$ of a constant $k=0.6$ mm than the calculated pupil diameter:
   detection of the fatigue of the driver of the vehicle; wherein
   the detection of the fatigue of the driver of the vehicle is correctable by a time-related correction factor with regard to a rate of reduction of the pupil diameter; and/or a light assist sensor.

5. The system according to claim 1, further comprising:
   at least one control unit, wherein the control unit is designed to introduce at least one corresponding countermeasure when fatigue of the driver of the vehicle is detected.

6. A method for exact detection of fatigue of a driver of a vehicle, comprising the steps of:
   sensing, by at least one camera, a pupil diameter of the driver of the vehicle;
   sensing, by at least one sensor, a current luminance in the vehicle; and
   detecting, by calculation in a computing module, whether the driver of the vehicle is affected by fatigue, wherein
   the calculation is based on the sensed pupil diameter and the sensed, current luminance in the vehicle; and
   the steps of detecting the fatigue of the driver of the vehicle by the computing module comprises:
   calculating the pupil diameter with respect to the sensed, current luminance;
   comparing the sensed pupil diameter with the calculated pupil diameter with respect to the sensed luminance; and
   if the sensed pupil diameter is smaller by more than a constant range $[k-0.3; k+1.4]$ of a constant $k=0.6$ mm than the calculated pupil diameter:
   detecting the fatigue of the driver of the vehicle, wherein
   the detecting of the fatigue of the driver of the vehicle is correctable by a time-related correction factor with regard to a rate of reduction of the pupil diameter; and/or a light assist sensor.

7. The method according to claim 6, wherein
the at least one camera comprises a high-resolution interior camera and/or a high-resolution infrared camera.

8. The method according to claim 6, wherein
the at least one sensor for sensing the current luminance in the vehicle comprises an adaptive forward lighting sensor.

9. The method according to claim 6, further comprising the step of:
introducing, by at least one control unit, a countermeasure when fatigue is detected.

10. A system for exact detection of fatigue of a driver of a vehicle, comprising:
at least one camera for sensing pupil diameter of the driver of the vehicle;
at least one sensor for sensing a current luminance in the vehicle; and
at least one computing module for detecting the fatigue of the driver of the vehicle by calculation, wherein
the calculation is based on the sensed pupil diameter and the sensed, current luminance in the vehicle, and
the computing module is further configured to convert the sensed, current luminance to a converted current luminance based on one or more of the size of a windshield of the vehicle and a distance between the driver and the windshield of the vehicle.

11. The system according to claim 5, wherein the countermeasure comprises adjusting an interior temperature of the vehicle.

\* \* \* \* \*